(12) United States Patent
Vom Bey et al.

(10) Patent No.: US 11,732,324 B2
(45) Date of Patent: *Aug. 22, 2023

(54) LOW INTERFACIAL CONTACT RESISTANCE MATERIAL, USE THEREOF AND METHOD OF PRODUCING SAID MATERIAL

(71) Applicant: HILLE & MÜLLER GMBH, Düsseldorf (DE)

(72) Inventors: Ernst Wilhelm Vom Bey, Ratingen (DE); Marcel Onink, Düsseldorf (DE); Ken-Dominic Flechtner, Düsseldorf (DE); Maurice Jean Robert Jansen, Haarlem (NL)

(73) Assignee: HILLE & MÜLLER GMBH, Düsseldorf (DE)

( * ) Notice: Subject to any disclaimer, the term of this patent is extended or adjusted under 35 U.S.C. 154(b) by 680 days.

This patent is subject to a terminal disclaimer.

(21) Appl. No.: 16/630,022

(22) PCT Filed: Jul. 10, 2018

(86) PCT No.: PCT/EP2018/068698
§ 371 (c)(1),
(2) Date: Jan. 10, 2020

(87) PCT Pub. No.: WO2019/011932
PCT Pub. Date: Jan. 17, 2019

(65) Prior Publication Data
US 2021/0087648 A1    Mar. 25, 2021

(30) Foreign Application Priority Data
Jul. 12, 2017    (EP) .................................. 17180863

(51) Int. Cl.
*H01M 50/128* (2021.01)
*H01M 50/526* (2021.01)
(Continued)

(52) U.S. Cl.
CPC .............. *C21D 9/48* (2013.01); *B32B 15/013* (2013.01); *C21D 8/0405* (2013.01);
(Continued)

(58) Field of Classification Search
CPC ...... C21D 9/48; C21D 8/0405; C21D 8/0436; C21D 8/0447; H01M 50/128;
(Continued)

(56) References Cited

U.S. PATENT DOCUMENTS 2,512,141 A    6/1950 Ma et al.
3,639,647 A *  2/1972 Kehl ..................... C07C 5/2791
                                                    502/220

(Continued)

FOREIGN PATENT DOCUMENTS

CN    102201456 A    9/2011
JP    2005082856 A   3/2005
(Continued)

OTHER PUBLICATIONS

JP 2007051324 MT (Year: 2010).*
(Continued)

*Primary Examiner* — Alexander Usyatinsky
(74) *Attorney, Agent, or Firm* — Vorys, Sater, Seymour and Pease LLP

(57) ABSTRACT

Method of producing a low interfacial contact resistance material for use in batteries or connectors and a low interfacial contact resistance material for use in batteries or connectors produced thereby.

19 Claims, 6 Drawing Sheets

(51) Int. Cl.
*C21D 9/48* (2006.01)
*H01M 50/164* (2021.01)
*B32B 15/01* (2006.01)
*C21D 8/04* (2006.01)
*H01M 50/545* (2021.01)
*H01M 50/503* (2021.01)
*H01M 50/522* (2021.01)
*C25D 3/54* (2006.01)
*C25D 5/50* (2006.01)

(52) U.S. Cl.
CPC ......... *C21D 8/0436* (2013.01); *C21D 8/0447* (2013.01); *H01M 50/128* (2021.01); *H01M 50/164* (2021.01); *H01M 50/503* (2021.01); *H01M 50/522* (2021.01); *H01M 50/526* (2021.01); *H01M 50/545* (2021.01); *B32B 2457/10* (2013.01); *C25D 3/54* (2013.01); *C25D 5/50* (2013.01)

(58) Field of Classification Search
CPC ............. H01M 50/545; H01M 50/164; H01M 50/526; B32B 15/013; B32B 2457/10; C25D 3/54; C25D 5/50
See application file for complete search history.

(56) References Cited

U.S. PATENT DOCUMENTS

2004/0104739 A1* 6/2004 Haga ................. C22C 19/07
324/755.05
2007/0089992 A1* 4/2007 Zhou ..................... C25D 5/605
205/264
2010/0167087 A1* 7/2010 Wijenberg ............... C25D 7/00
428/680

FOREIGN PATENT DOCUMENTS

| JP | 2006294353 | A | | 10/2006 |
| JP | 2007051324 | A | | 3/2007 |
| JP | 2007051324 | | * | 7/2010 |
| JP | 2010209405 | A | | 9/2010 |
| WO | 02084306 | A1 | | 10/2002 |
| WO | 2017118751 | A1 | | 7/2017 |

OTHER PUBLICATIONS

Decision to grant a patent issued by JPO for Application No. 2020-501300 (Year: 2022).*

International Search Report and Written Opinion dated Sep. 4, 2018 for PCT/EP2018/068698 to Hille & Müller GMBH filed Jul. 10, 2018.

F. Barbir; J. Braun; J. Neutzler: "Properties of Molded Graphite Bi-Polar Plates for PEM Fuel Cell Stacks", Journal of New Materials for Electrochemical Systems, vol. 2, 1999, pp. 197-200.

Examination Report dispatched Mar. 17, 2022 to Hille & Müller GMBH for IN Application No. 202047005134 filed Feb. 6, 2020.

Translation of Japanese Office action dated Jul. 22, 2022 for JP Application No. 2006294353.

* cited by examiner

LOW INTERFACIAL CONTACT RESISTANCE MATERIAL, USE THEREOF AND METHOD OF PRODUCING SAID MATERIAL

CROSS-REFERENCE TO RELATED APPLICATIONS

This is a § 371 National Stage Application of International Application No. PCT/EP2018/068698 filed on Jul. 10, 2018, claiming the priority of European Patent Application No. 17180863.7 filed on Jul. 12, 2017.

This invention relates to a low interfacial contact resistance material, a method to produce said material and to batteries and connector material produced therefrom.

Materials used for batteries and connector materials benefit from a low interfacial contact resistance (ICR). The lower the ICR, the lower the internal losses of the battery or ohmic heating at the connector.

Currently steel strip is the choice material used for batteries or connector materials. Steel is relatively cheap, easy to recycle, and allows large deformations. The basis for may batteries, such as the AA and AAA battery, is a deep-drawn and wall ironed can. FIG. 5 shows a typical AA-battery (http://www.varta-consumer.nl/nl-nl/insights/did-you-know/2015/how-are-batteries-made) showing the steel can and (anode) cap which jointly form the structural basis of the battery.

The steel strip commonly used for these applications is electro nickel plated steel strip, such as Hilumin®. It is created by electroplating cold-rolled steel with nickel and diffusion annealing. HILUMIN® offers low contact resistance and high corrosion resistance. It is used in alkaline battery cans (including AA, AAA, C, D and 9V) and all other battery types including rechargeable and ZincAir. Hilumin Cobalt product has an additional cobalt plating for extended shelf life and reduced ICR.

Although these materials function properly and to the satisfaction of the battery producers and consumers, it was found that a further improvement would require a material with a lower ICR than Ni-plated or Ni—Co plated material. Moreover, the use of a cobalt plating bath adds to the cost of the process and also makes the production process of the material more complicated technically and logistically.

It is an object of the present invention to provide a material with a lower interfacial contact resistance than the current Ni-plated or Ni—Co plated material It is also an object of the present invention to provide a material with a lower interfacial contact resistance than the current Ni-plated or Ni—Co plated material that does not require a cobalt plating layer.

One or more of the objects is reached by the low interfacial contact resistance material for use in batteries or connectors comprising a steel strip substrate (1) provided on both sides with a nickel layer (2a, 2b), and provided on at least one side with a nickel-molybdenum alloy layer (3) wherein the interfacial contact resistance of the nickel-molybdenum alloy layer is at most 20 $m\Omega \cdot cm^{-2}$.

According to the invention the low interfacial contact resistance material for use in batteries or connectors, is produced by providing a steel strip substrate (1) on one side with a nickel layer (2b), and provided on the other side with a nickel-molybdenum alloy layer (3) which is a diffusion layer which contains nickel and molybdenum wherein the nickel originates from the nickel or nickel-based layer first deposited on the steel strip substrate and the molybdenum originates from the at least partly and preferably fully reduced molybdenum oxide layer deposited onto the nickel or nickel based layer, wherein the interfacial contact resistance of the resulting nickel-molybdenum alloy layer is at most 20 $m\Omega \cdot cm^{-2}$, when measured at a pressure P of 1.37 MPa (200 psi) according to the method described in the description.

The low interfacial contact resistance material for use in batteries or connectors comprising a steel strip substrate (1) is provided on both sides with a nickel layer (2a, 2b), and provided on at least one side with a nickel-molybdenum alloy layer (3) after which it is subjected to an annealing step. The nickel layer or layers provided with the molybdenum oxide layer is converted into a nickel-molybdenum alloy layer having an interfacial contact resistance of at most 20 $m\Omega \cdot cm^{-2}$ by reduction of the molybdenum oxide to molybdenum metal and by diffusion of the molybdenum metal into the nickel layer or layers. If only one nickel layer is provided with a molybdenum oxide layer, then the other nickel layer remains a nickel layer. If both nickel layers are provided with a molybdenum oxide layer, then no pure nickel layer remains after annealing.

The value of 20 $m\Omega \cdot cm^{-2}$ mentioned herein above is measured using the method described below, and measured at a pressure P of 200 psi (=13.8 bar or 1.37 MPa). Preferably the interfacial contact resistance of the nickel-molybdenum alloy layer is at most 20 $m\Omega \cdot cm^{-2}$ for any pressure P larger than 10 bar (=145 psi or 1.0 MPa) or even for any pressure P above 5 in this measurement. This is shown, e.g., in FIG. 7 for a substrate thickness of 0.25 mm, which has a value of 1.07 at P=13.8 bar (200 psi), and has a value under 5 for all pressures P from 5 bar and up.

In the context of this invention it is clear that the nickel-molybdenum alloy layer is identical to the nickel-molybdenum diffusion layer, and abbreviated as NiMo layer or NiMo alloy layer.

Preferably the interfacial contact resistance of the nickel-molybdenum alloy layer is at most 15 $m\Omega \cdot cm^{-2}$. More preferably the interfacial contact resistance of the nickel-molybdenum alloy layer is at most 10 $m\Omega \cdot cm^{-2}$ or even at most 5 $m\Omega \cdot cm^{-2}$. Preferably the interfacial contact resistance of the nickel-molybdenum alloy layer is at most 15, 10 or 5 $m\Omega \cdot cm^{-2}$ for any pressure P larger than 10, or even for any pressure P larger than 5 bar in this measurement.

The invention is also embodied in a battery or in connector material produced using the low interfacial contact resistance material according to the invention. The connector material may be used for connecting batteries into a battery pack so as to generate a higher voltage. Alternatively, the connector material may be used in switches or other electrical connectors where a low interfacial contact resistance is important.

The invention is also embodied in a battery wherein the can and/or the cap is produced from the low interfacial contact resistance material according to the invention. The can and cap are thus produced that the side with the NiMo layer is on the inside of the battery.

According to a second aspect a method of producing a battery or connector material comprising the following steps is provided. The method comprises the following steps:
  providing a steel substrate in the form of a cold-rolled strip;
  providing a nickel layer on one or both sides of the steel substrate to form a nickel plated substrate;
  electrodepositing a molybdenum oxide layer from an aqueous solution onto the nickel plated substrate wherein the plated substrate acts as a cathode, wherein the aqueous solution comprises a molybdenum salt and an alkali metal phosphate and wherein the pH of the aqueous solution is adjusted to between 4.0 and 6.5;

wherein the plated substrate provided with the molybdenum oxide layer is subjected to an annealing step in a reducing atmosphere to, at least partly and preferably fully, reduce the molybdenum oxide in the molybdenum oxide layer to molybdenum metal in a reduction annealing step and to form, simultaneously or subsequently, in the annealing step a diffusion layer which contains nickel and molybdenum, wherein the nickel originates from the nickel or nickel-based layer and the molybdenum originates from the molybdenum oxide layer.

The diffusion layer contains nickel and molybdenum. There may be other components in the diffusion layer such as phosphate or phosphorus resulting from the alkali metal phosphate. The interfacial contact resistance material for use in batteries or connectors according to the invention is deemed to be low if the interfacial contact resistance of the nickel-molybdenum alloy layer is at most 20 $m\Omega \cdot cm^{-2}$ when measured according to the method described in the description. Preferably the interfacial contact resistance of the nickel-molybdenum alloy layer is at most 15 $m\Omega \cdot cm^{-2}$. More preferably the interfacial contact resistance of the nickel-molybdenum alloy layer is at most 10 $m\Omega \cdot cm^{-2}$ or even at most 5 $m\Omega \cdot cm^{-2}$. Preferably the interfacial contact resistance of the nickel-molybdenum alloy layer is at most 15, 10 or 5 $m\Omega \cdot cm^{-2}$ for any pressure P larger than 10, or even for any pressure P larger than 5 bar in this measurement.

The metal substrate, which may be provided in the form of a coiled strip of steel such as (low) carbon steel with a suitable chemical composition for the application of the final product, is provided with a nickel layer to form a plated substrate. Nickel layers can for instance be deposited onto the substrate in a Watts nickel plating bath. The nickel layer may contain some impurities, but the term "nickel layer" hereinafter intends to mean a plating layer wherein the deposited metal is predominantly, and preferably exclusively, nickel. It is noted that usually the nickel layer thickness is not the same on both sides because in most cases a differential coating is used. The choice of plating layer thickness depends on the later application of the material.

The nickel plated substrate is then led through the said aqueous solution in an electroplating device in which the plated substrate acts as the cathode, and provided with the molybdenum oxide layer. The molybdenum oxide in the molybdenum oxide layer is then reduced to molybdenum metal in a reduction annealing step and, as a consequence of the high temperature during the reduction annealing step, the molybdenum diffuses into the nickel layer, thereby forming a diffusion layer comprising nickel and molybdenum. So the reduction annealing step is also the diffusion annealing step. This is the preferable case. However, if necessary, the annealing step can be prolonged to further promote the diffusion after the reduction of the molybdenum oxide has been completed. Preferably the reducing atmosphere is a hydrogen containing atmosphere, such as substantially pure hydrogen or HNX.

The inventors found that the diffusion layer comprising nickel and molybdenum is pore free, and provides an excellent protection of the substrate. The pores in the nickel layer, if present, are closed as a result of the use of the method according to the invention.

It should be noted that after the reduction annealing step in principle all molybdenum oxide is reduced to molybdenum metal. However, after exposure of the annealed strip to the ambient atmosphere the outermost surface may reoxidise. On a 150 nm thick diffusion layer a 20 to 30 nm thick oxide layer may be present.

In an embodiment the molybdenum salt is ammonium molybdate ($(NH_4)_6Mo_7O_{24}$). The advantage of the use of ammonium as the cation is that it decomposes during the heat treatment. Other molybdenum salts would result in deposits on the surface. E.g. sodium-molybdate would result in the presence of sodium on the surface which would result in an undesirable alkaline corrosion reaction.

In an embodiment the phosphate is sodium dihydrogen phosphate ($NaH_2PO_4$). This functions acts both a conducting salt in the electrolyte and as a buffer salt. The buffer ensures that the right pH-value of the electrolyte is maintained. Potassium dihydrogen phosphate ($KH_2PO_4$) could technically also be used, alone or as a mixture with $NaH_2PO_4$, but $KH_2PO_4$ is currently more expensive and therefore economically less attractive.

In further embodiments of the invention wherein the nickel layer provided on the substrate is between 0.1 and 5 μm in thickness. This thickness range provides sufficient thickness for the diffusion layer after the reduction annealing to be effective. It is preferable that the diffusion layer comprising of nickel, originating from the nickel layer and molybdenum, originating from the reduced molybdenum oxide layer, has a thickness of between 10 and 200 nm. A preferable minimum thickness is 20 nm, and a preferable maximum thickness is 150 nm. Preferably the thickness of the diffusion layer is between 50 and 100 nm.

In an embodiment
  the temperature of the aqueous solution for the electrodeposition of the molybdenum oxide layer onto the nickel plated substrate is between 40° C. and 75° C., and/or
  the plating time for the electrodeposition of the molybdenum oxide layer onto the nickel plated substrate is between 5 and 30 seconds, and/or
  the current density for the electrodeposition of the molybdenum oxide layer onto the nickel plated substrate is between 2 and 25 $A/dm^2$, and/or
  the maximum annealing temperature during the annealing step is between 500 and 1050° C., and/or
  the annealing time is between 6 and 10 hours for a batch annealing process or between 10 and 120 seconds for a continuous annealing process.

These features are independent and can be applied separately or in combination.

Preferably the temperature of the aqueous solution is at least 51° C. and/or at most 69° C. The plating time is preferably at most 20 seconds, whereas it is preferable that the current density for the electrodeposition of the molybdenum oxide layer is at least 6 and/or at most 22 $A/dm^2$. More preferably the temperature of the aqueous solution is at least 55° C. and/or at most 65° C.

In relation to the maximum annealing temperature during the annealing step a distinction can be made in dependence of the substrate. It was found that for a low-carbon steel substrate the maximum annealing temperature is 700° C., preferably 650° C. and more preferably 600° C. to prevent too large an impact on the properties of the steel substrate. The lower limit of the annealing temperature is controlled largely by the lay-out of the annealing facilities and of the economy of the process. The lower the temperature, the longer it takes for a Ni—Mo-diffusion layer of a desired thickness to form.

The annealing time in the batch annealing process is between 6 and 10 hours, preferably at most 8.5 hours and more preferably at most 7.5 hours. For a continuous annealing process the annealing time is at most 120 seconds, preferably at most 95 s, more preferably at most 75 s and even more preferably at most 40 s. A suitable minimum continuous annealing temperature is 5 s, preferably at least 10 s. There is a degree of interchangeability between the annealing time and the annealing temperature. It should be noted that when referring to an annealing time of 8.5 hours in a batch annealing furnace this intends to mean that the coldest spot of the (coiled) material reaches the set temperature in 8.5 hours, after which the cooling starts. A total cycle of heating and cooling may therefore be considerably longer than 8.5 hours and be more than double that value.

In an embodiment the aqueous solution for the electrodeposition of the molybdenum oxide layer onto the plated substrate comprises:

between 10 and 50 g/l of $(NH_4)_6Mo_7O_{24}$, and/or
between 20 and 80 g/l of $NaH_2PO_4$.

This composition allows to effectively and reproducibly deposit the molybdenum oxide layer. It is noted that 30 g/l of $(NH_4)_6Mo_7O_{24}$ corresponds to 0.024 mol/l and 50 g/l of $NaH_2PO_4$ to 0.42 mol/l.

In a preferable embodiment the thickness of the deposited molybdenum oxide layer is at most 100 nm, preferably at most 75 nm, more preferably 50 nm, and even more preferably 40 nm. Preferably the minimum thickness is at least 10 nm.

In an embodiment the pH of the aqueous solution is at least 4.5 and/or at most 6. Preferably the pH is at least 5.25 and/or at most 5.75.

In an embodiment the aqueous solution is maintained at a temperature between 50 and 70° C. and/or In a preferable embodiment wherein the cathodic current density for depositing the molybdenum oxide layer is at least 12.5 A/dm$^2$ and preferably at least 15 A/dm$^2$. Preferably the cathodic current density is at most 22.5 A/dm$^2$.

Preferably the steel substrate is a carbon steel, preferably a low carbon steel, extra-low carbon steel or a HSLA-steel. These unalloyed (LC and ELC) or micro-alloyed (HSLA) steels are relatively cheap substrates and provide good strength and formability. The steels are produced by means of commonly known processes such as casting, hot-rolling and cold-rolling. Low carbon steels typically comprise 0.05 to 0.15 wt. % C and extra low carbon steels typically comprise 0.02 to 0.05 wt. % C. Other elements may be present in addition to carbon in accordance with EN 10020-2000 which prescribes how much of a certain element may be present to still be considered an unalloyed steel. High-strength low-alloy (HSLA) steels (aka micro-alloyed steels) are designed to provide better mechanical properties and/or greater resistance to atmospheric corrosion than carbon steels. The HSLA steels have low carbon contents (0.05-0.15% C) in order to produce adequate formability and weldability, and they have manganese contents up to 2.0%. Small quantities of chromium, nickel, molybdenum, copper, nitrogen, vanadium, niobium, titanium and zirconium are used in various combinations to achieve the desired properties. It is preferable that the steel substrate has been cold-rolled to its final thickness, usually between 0.15 and 1.5 mm, and the cold-rolled steel substrate may or may not have been recrystallisation or recovery annealed prior to depositing the nickel layer according to the invention. The steel substrate is preferably supplied in the form of a coiled strip.

In an embodiment the diffusion layer comprising of nickel originating from the nickel layer and molybdenum originating from the molybdenum oxide layer also comprises phosphor, preferably 5 to 15 wt. % of phosphor, more preferably 6 to 13 wt. %. A suitable maximum amount is 10 wt. %. A suitable minimum amount is 7 wt. %. Although the oxidation state of the phosphor is not exactly known, it is believed that the phosphor originated from the phosphate in the electrolyte. It may even still be present as phosphate in the layer. It is believed that its presence contributes to the corrosion protection of the layer.

The invention is also embodied in a low interfacial contact resistance material consisting of a steel strip as substrate provided with a diffusion layer comprising nickel and molybdenum, produced according to the invention wherein the diffusion layer (i.e. the Ni—Mo-diffusion layer) has a thickness of between 10 and 200 nm. A preferable minimum thickness is 20 nm, and a preferable maximum thickness is 150 nm. Preferably the thickness of the Ni—Mo-diffusion layer is between 50 and 100 nm. This thickness can be determined e.g. by means of GDOES. The thickness of the layer is determined by locating the half-value (ignoring the surface effects) of the Mo-curve. The thickness in FIG. 2 (before annealing) results in a Ni—Mo-layer thickness of 60 nm and in FIG. 3 in a Mo-alloy layer of 80 nm. It is noted that FIG. 3 shows that the tail of the Mo-signal in FIG. 3 is much more pronounced than in FIG. 2 as a result of the diffusion of the Mo into the nickel layer.

In a preferable embodiment the process of producing the battery comprises:

a deep drawing and/or wall-ironing step to produce the steel can from a blank produced from the low interfacial contact resistance material wherein the side of the blank provided with the nickel-molybdenum alloy layer (3) becomes the inside of the can, and/or a forming step to produce the cap to cover the open end of the steel can from the low interfacial contact resistance material wherein the side of the cap provided with the nickel-molybdenum alloy layer (3) becomes the inside of the cap.

In an embodiment the low interfacial contact resistance material is provided in a form suitable for use as a connector material, and wherein the connector material is used to connect individual batteries into a battery pack, wherein the side of the connector material provided with the nickel-molybdenum alloy layer is connected to the anode or cathode of the individual batteries.

The invention will now be further explained by means of the following, non-limitative examples.

EXAMPLES

For the various nickel layers a conventional Watts plating bath is used. The Watts electrolyte combines nickel sulphate, nickel chloride and boric acid. The pH is maintained between 3.5 and 4.2 (aim 3.7) and the temperature of the bath is between 60 and 65° C. Nickel sulphate is the source of most of the nickel ions and is generally maintained in the range of 150-300 g/L. It is the least expensive nickel salt, and the sulphate anion has little effect on deposit properties. Nickel chloride improves the conductivity of the plating bath. The typical operating range is 30-150 g/L. Boric acid buffers the hydrogen ion concentration (pH) in the cathode film. If it were not for this buffering action, the cathode film pH in the higher-current-density regions would very quickly exceed 6.0, and nickel hydroxide would be precipitated and codeposited along with hydrogen, resulting in a green nodulation or burned deposit.

An aqueous solution was prepared consisting of 30 g/l of $(NH_4)_6Mo_7O_{24}$ (0.024 mol/l) and 50 g/l of $NaH_2PO_4$ (0.42 mol/l) with a pH of 5.5 and maintained at 60° C. A molybdenum-oxide layer was deposited on different nickel plated low-carbon steel strips using a current density of 20 A/dm² and a plating time of 15 and 10 seconds. This material was then annealed in a reducing hydrogen atmosphere for 7.3 hours in a batch annealing furnace. The resulting Ni—Mo-diffusion layer has a thickness of about 150 nm at the surface of the coated substrate.

Experiments using the conditions above result in the following linear dependence of the amount of Mo deposited on plating time (measured after annealing using Atomic Absorption Spectroscopy after dissolution of the layer of the substrate in HCl (1:1)).

| Plating time (s) | A/dm² | mg (Mo)/m² |
|---|---|---|
| 5 | 20 | 94 |
| 10 | 20 | 128 |
| 15 | 20 | 174 |
| 20 | 20 | 220 |

FIG. 1 shows a non-limitative example of the implementation of the process according to the invention. The hot-rolled starting product is pickled to remove the oxides from the strip and clean the surface. After pickling the strip is cold-rolled. The steel grade used is DC04 (EN10139). In the plating step the various layers are electrodeposited. In the annealing step the diffusion annealing takes place. The cold-rolling can obviously also take place elsewhere when the cold-rolled coil is bought from a supplier of cold rolled coil.

FIG. 2 shows a GDOES-measurement of the surface after depositing the molybdenum oxide on the nickel layer. The X-axis gives the thickness in nm and the Y-axis gives the concentration in wt. %. Note that the values for carbon and sulphur are in fact 10 times as low as presented. Clearly visible is the layer of molybdenum oxide on top of the nickel layer. The nickel layer is 2 μm (i.e. 2000 nm), whereas the molybdenum oxide layer is about 60 nm.

FIG. 3 shows a GDOES-measurement of the surface after annealing the layers of FIG. 2. Note that the values for carbon and sulphur are in fact 10 times as low as presented. The clearly discernible layer of molybdenum oxide on top of the nickel layer has vanished, and a diffusion layer comprising nickel and molybdenum is shown. There is still a degree of oxygen present in the surface layers, but this is believed to be associated with re-oxidation of the surface, and with the presence of the phosphates, and not with the molybdenum oxide which has reduced to metallic molybdenum.

FIG. 4 shows a schematic drawing of the layer structure before (A) and after (B) the diffusion annealing. In this example the steel substrate 1 is provided on both sides with a nickel layer 2a and 2b. The thickness of both nickel layers may be different. Usually the nickel layer which becomes the outside of the can (2b) is thicker than the nickel layer which becomes the inside of the can (2a) after deep-drawing the low interfacial contact resistance material into a can for use in a battery. A molybdenum oxide layer 3 is subsequently provided on nickel layer 2a.

After the diffusion annealing (B) the layer 2b is practically unaltered, possibly with some minor interdiffusion of iron and nickel at the interface between the steel substrate and the nickel layer 2b, but the molybdenum oxide layer has been reduced to metallic molybdenum and also interdiffusion of nickel and molybdenum has taken place leading to the formation of a NiMo alloy layer on top of the steel substrate. Clearly, the mechanism would be equal on both sides if a molybdenum oxide layer 3 is provided on both nickel layer 2a and 2b. In that case the resulting material would essentially consist of a steel substrate provided with a NiMo alloy layer on both sides of the substrate. Initially all molybdenum is located on top of the nickel layer (2a), and during the annealing the molybdenum diffuses into the nickel layer. The concentration of molybdenum therefore decreases when moving through the diffusion layer to the steel substrate, as clearly visible when comparing FIG. 2 with FIG. 3. If the nickel layer is very thick compared to the molybdenum layer and/or the annealing time not very long, and/or the annealing temperature not very high, then the molybdenum concentration near the steel substrate will be very low indeed. Consequently, the schematic indication of the situation after annealing (B) in FIG. 4 which indicates the presence of a NiMo alloy layer (3') on top of the steel substrate means that the molybdenum has diffused into the nickel layer. Depending on the relative thicknesses of the original nickel layer and the molybdenum layer, the annealing time and the annealing temperature, the concentration of molybdenum in the original nickel layer near the steel substrate may be negligible, so that in effect the situation after annealing is that the steel substrate is provided with a nickel layer, which is practically unaltered, possibly with some minor interdiffusion of iron and nickel at the interface between the steel substrate and the nickel layer, and that on top of this practically unaltered nickel layer a nickel-molybdenum diffusion layer is provided, wherein the concentration of molybdenum decreases and the nickel concentration increases when moving from the surface of the NiMo alloy layer towards the steel substrate as depicted in FIG. 3, and as schematically depicted in FIG. 11. FIG. 11 shows the initial situation before the diffusion of the Ni (dashed line) and Mo (solid line) concentration, and the situation after a degree of diffusion has taken place. A fully Mo-layer (left) and a fully Ni-layer (middle) is deposited on a steel substrate (Fe, right). After annealing at a certain temperature for a certain period of time a diffusion profile will have been established in which Ni has diffused into the Mo-layer and Mo has diffused into the Ni-layer (any difference in diffusion speed of one element in the other v.v. has been ignored). As the initial Mo-layer is thinner than the initial Ni-layer, the Mo has not penetrated into the full thickness of the Ni-layer, leaving the Ni-layer nearest to the Fe-substrate substantially Mo-free, but this is still considered part of layer 3' in FIG. 4B. The layers 2 and 3 as well as 3' as depicted in FIG. 4A and B are also shown in FIG. 11. When the annealing is at a sufficiently high temperature for a sufficiently long time there may be Mo that reaches the Ni—Fe interface.

Method for Determining the Interfacial Contact Resistance (ICR)

Figure 1:
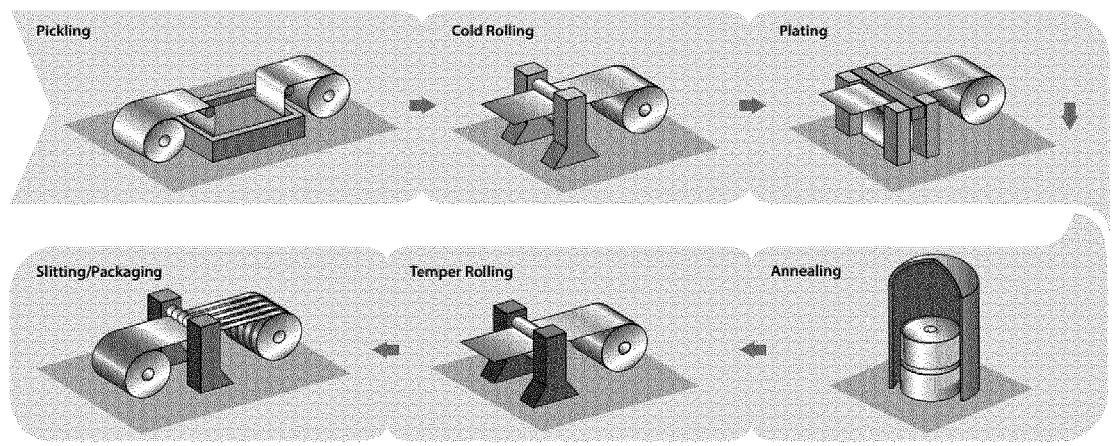
Figure 2:
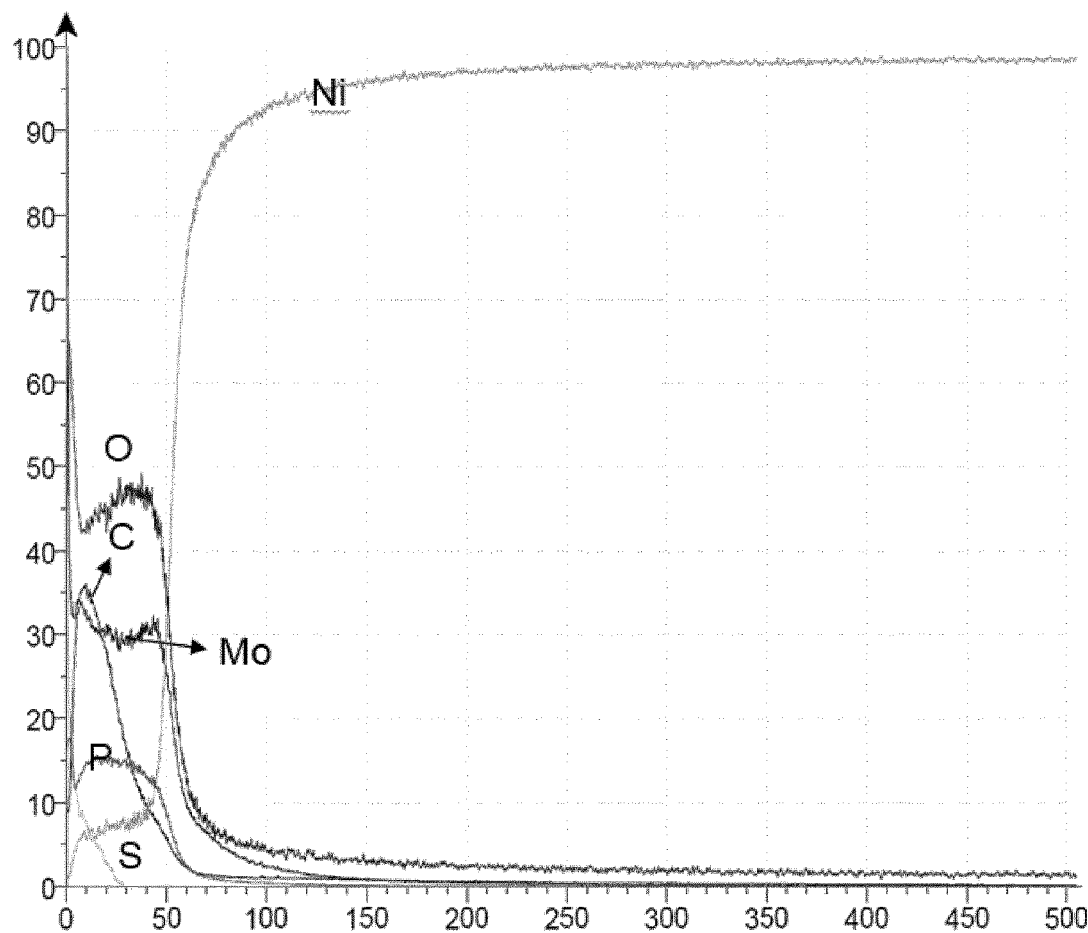
Figure 3:
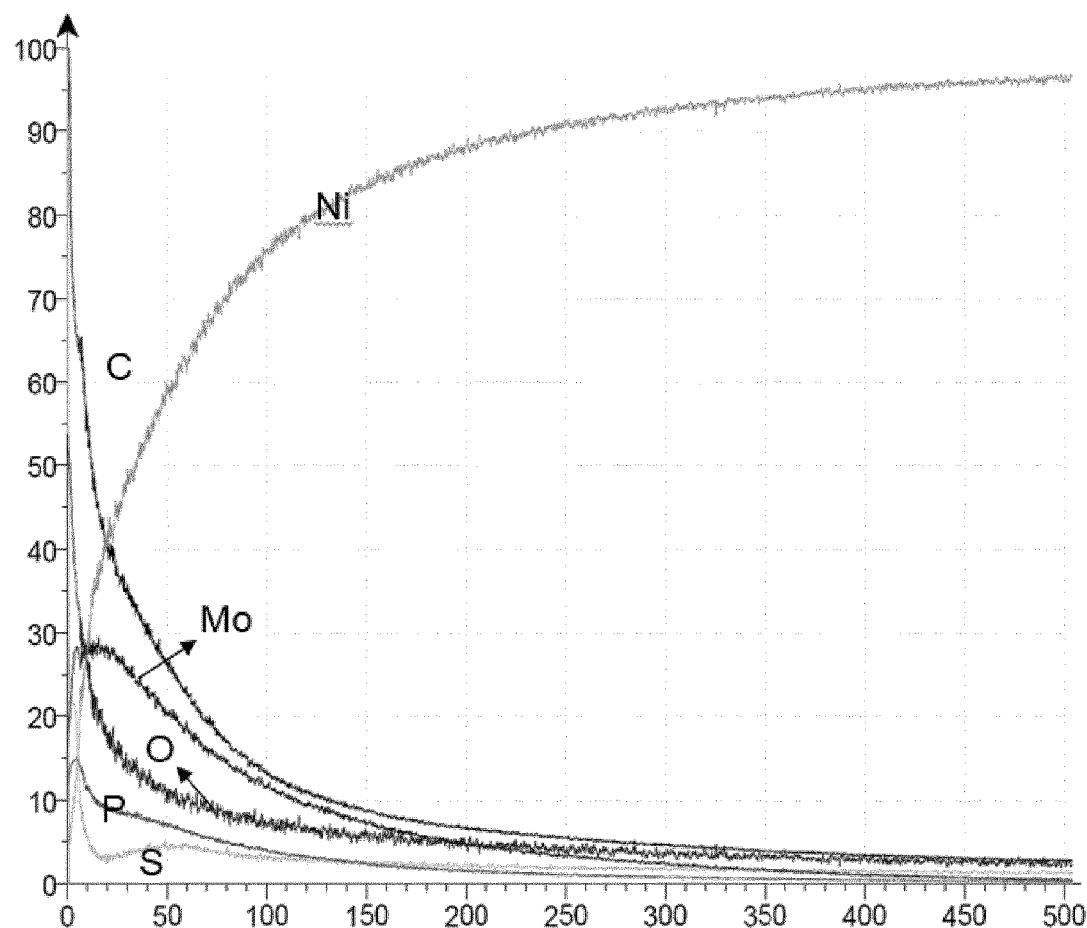
Figure 4:
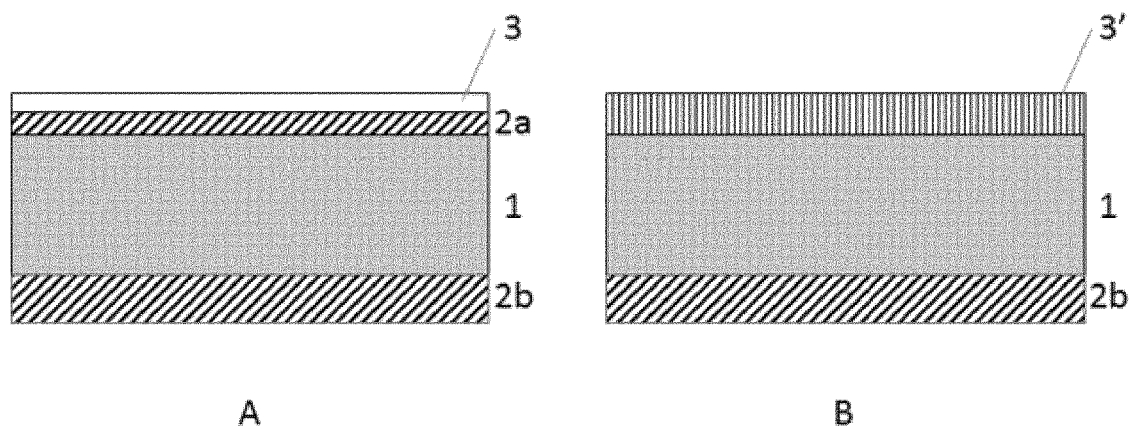
Figure 5:
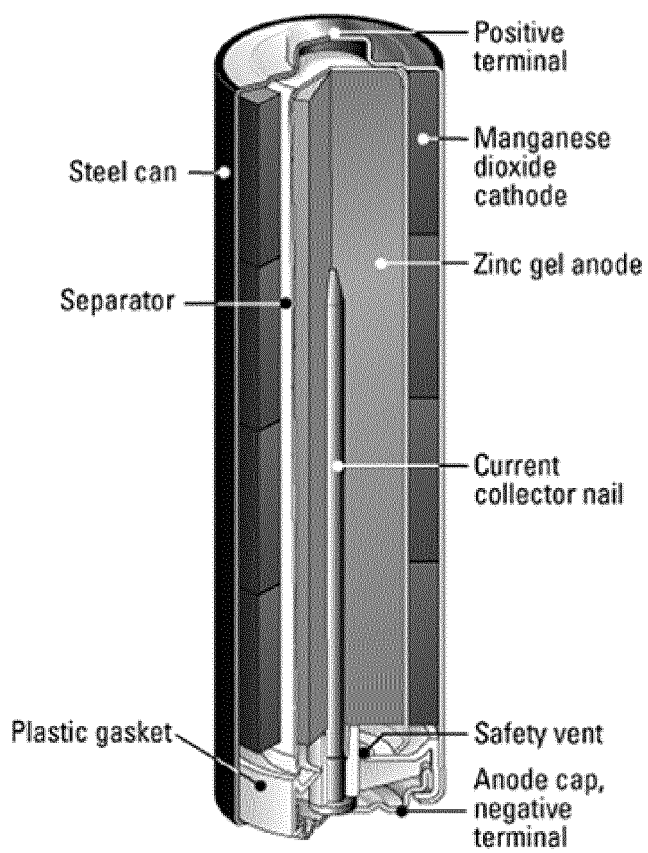
FIG. 5 shows a typical AA-battery showing the elements of a battery including the steel can and (anode) cap which jointly form the structural basis of the battery.
Figure 6:
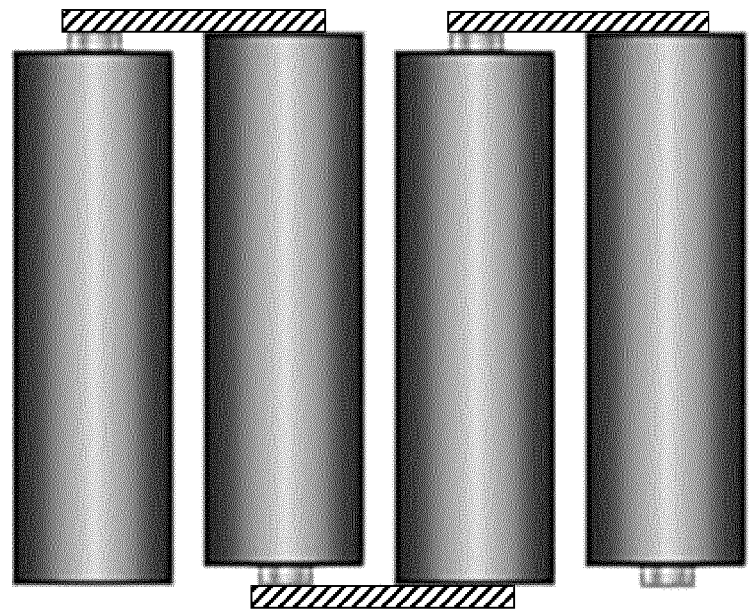
FIG. 6 shows a typical and schematic use of connector material to produce battery packs.
Figure 7:
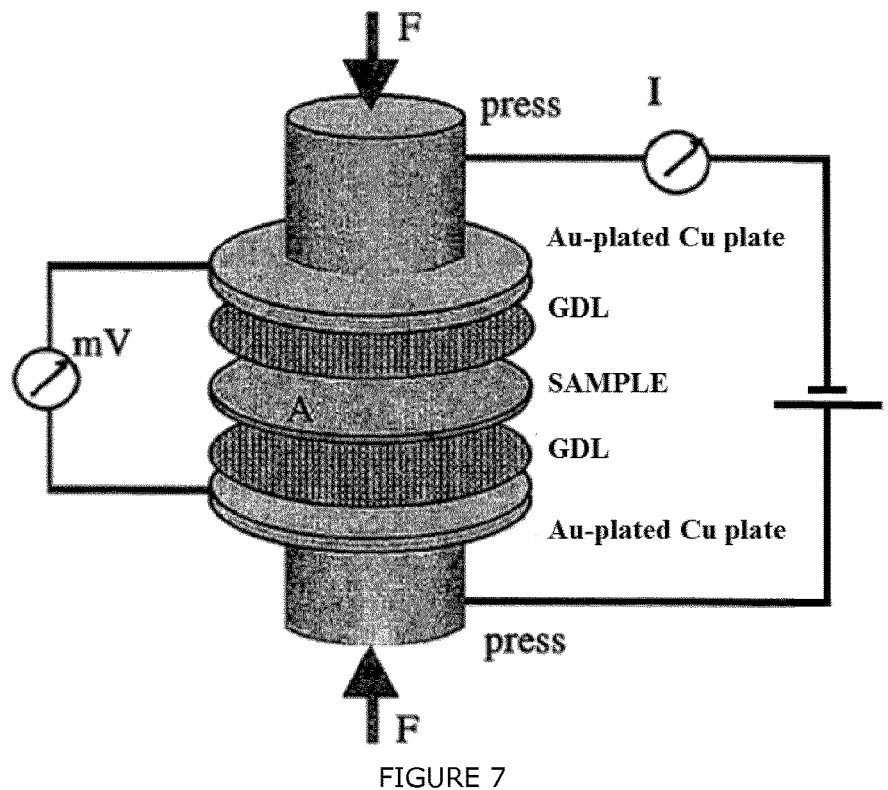

FIG. 7 shows the set-up for the measurements of the interfacial contact resistance. This set-up is used also in measurements of the total electrical DC resistance, thus including interfacial contact resistance, of fuel cell stacks (Properties of Molded Graphite Bi-Polar Plates for PEM Fuel Cell Stacks, F. Barbir, J. Braun and J. Neutzler, Journal of New Materials for Electrochemical Systems 2, 197-200 (1999)).

The interfacial contact resistance (ICR) test is based on Ohm's law, R=V/I, where R is the resistance in Ohms, V is the potential difference in Volts and I is the current in Amperes. A current of 10 Amperes is led through the sample, and the potential is measured, and this potential can then be used to calculate the resistance over the surface area of the sample. As backing plate a gas diffusion layer (GDL) is used on both sides of the sample (A). For the tests presented below Toray Paper TGP-H-120 was used as GDL. This is a carbon fibre composite paper suitable for use as a catalyst backing layer. It has a total thickness of 370 um (microns). By first placing the sample between two GDLs and then placing the GDL and sample between the two gold-plated copper pressure plates, the potential can be measured at certain pressure, the amount of pressure being applied to the sample is dependant of the size of the sample, for each new pressure value a 30 seconds interval is used before the current is determined. The dimensions of the gold-plated copper pressure plates is irrelevant because a pressure is imposed on the sample, but for the tests in this invention rectangular plates of 4×4 cm$^2$ or 2×2.5 cm$^2$ plates. The reference value of the pressure P is 200 psi (=13.8 bar, or 1.37 MPa). Prior to the testing of any sample A, several measurements were conducted with only two GDLs and no sample present, the average value of these measurement is then subtracted from the measurement done with the sample so that what remains is the ICR value of only the sample.

ICR RESULTS

A 0.25 mm low-carbon cold-rolled steel strip (DC04 (EN 10139), 76% CR, annealing at 610° C.) was coated with a 1.8 μm Nickel on both sides and 77.5 mg/m$^2$ Molybdenum on one side (sample 330). A 0.61 mm low-carbon cold-rolled steel strip (DC04 (EN 10139), double reduced CR1=78%, recrystallisation annealing, CR2=55%, annealing at 610° C.) was coated with a 3.2 μm Nickel on both sides, and 50 mg/m$^2$ Molybdenum (sample 257). The Mo-content is determined after annealing, but as the Mo does not disappear, the amount is the same before and after annealing. All samples were temper rolled.
Results at P=200 psi (1.37 MPa)

|        | 330  | 257  | (i)   | (ii)  | (iii) | (iv)  | (v)   | (vi)  |
|--------|------|------|-------|-------|-------|-------|-------|-------|
| #1     | 1.09 | 8.34 | 50.10 | 65.00 | 61.67 | 43.56 | 29.69 | 13.99 |
| #2     | 1.15 | 7.99 | —     | —     | —     | —     | —     | —     |
| #3     | 0.97 | 6.46 | —     | —     | —     | —     | —     | —     |
| Avg    | 1.07 | 7.60 | 50.10 | 65.00 | 61.67 | 43.56 | 29.69 | 13.99 |
| stdevp | 0.07 | 0.82 | —     | —     | —     | —     | —     | —     |

(i) 1.50/0.60 μm Ni (inside/outside)
(ii) 0.30 Ni + 0.10 Co/1.20 Ni (i/o)
(iii) 1.20 Ni + 0.10 Co/0.5 Ni (i/o)
(iv) 1.30 Ni + 0.20 Co/1.50 Ni (i/o)
(v) 1.30 Ni + 0.20 Co/1.50 Ni (i/o)
(vi) 1.80 Ni + 0.20 Co/0.20 Ni (i/o)

Figure 8:
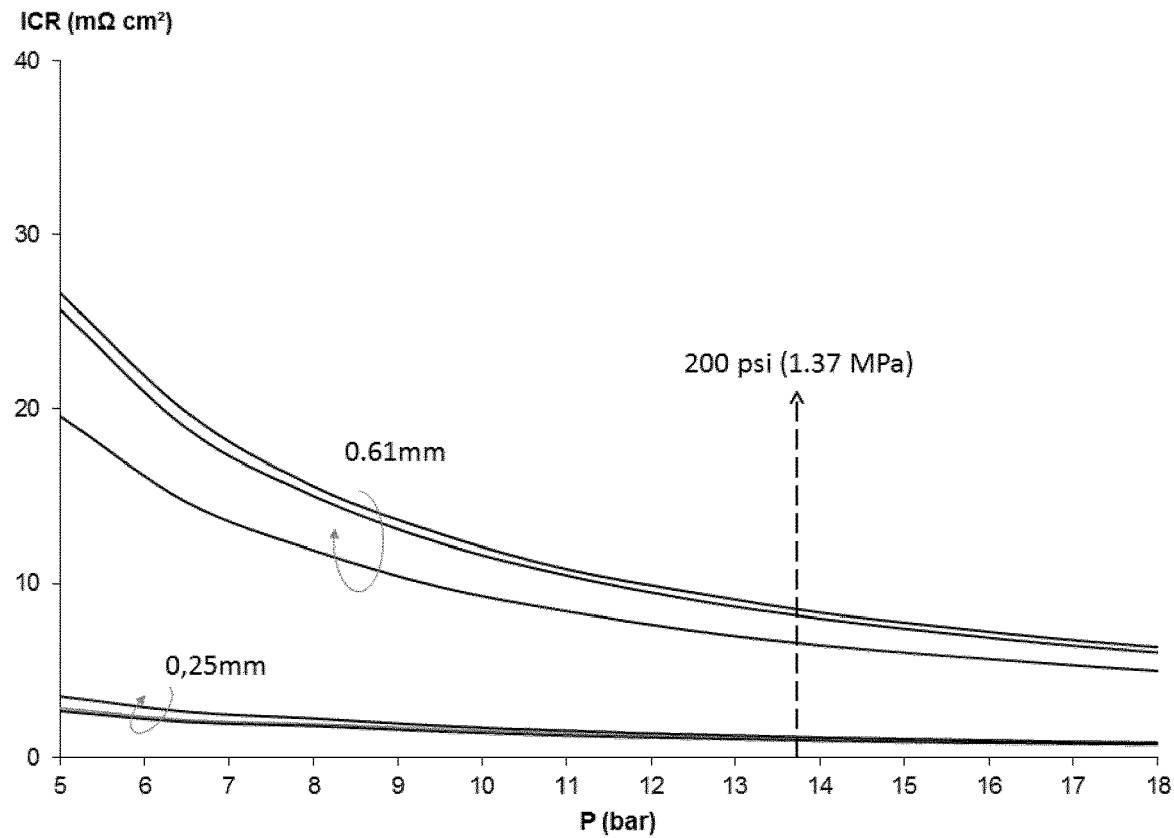

FIG. 8 shows the ICR for NiMo layers with a different substrate thickness. It is apparent that the influence of the substrate causes the measured ICR to increase with increasing substrate thickness. However, for the substrate thicknesses that are applied for batteries and connector materials the value at 200 psi is well below the lowest value presented in the table for Ni and Ni+Co coatings.

Figure 9:
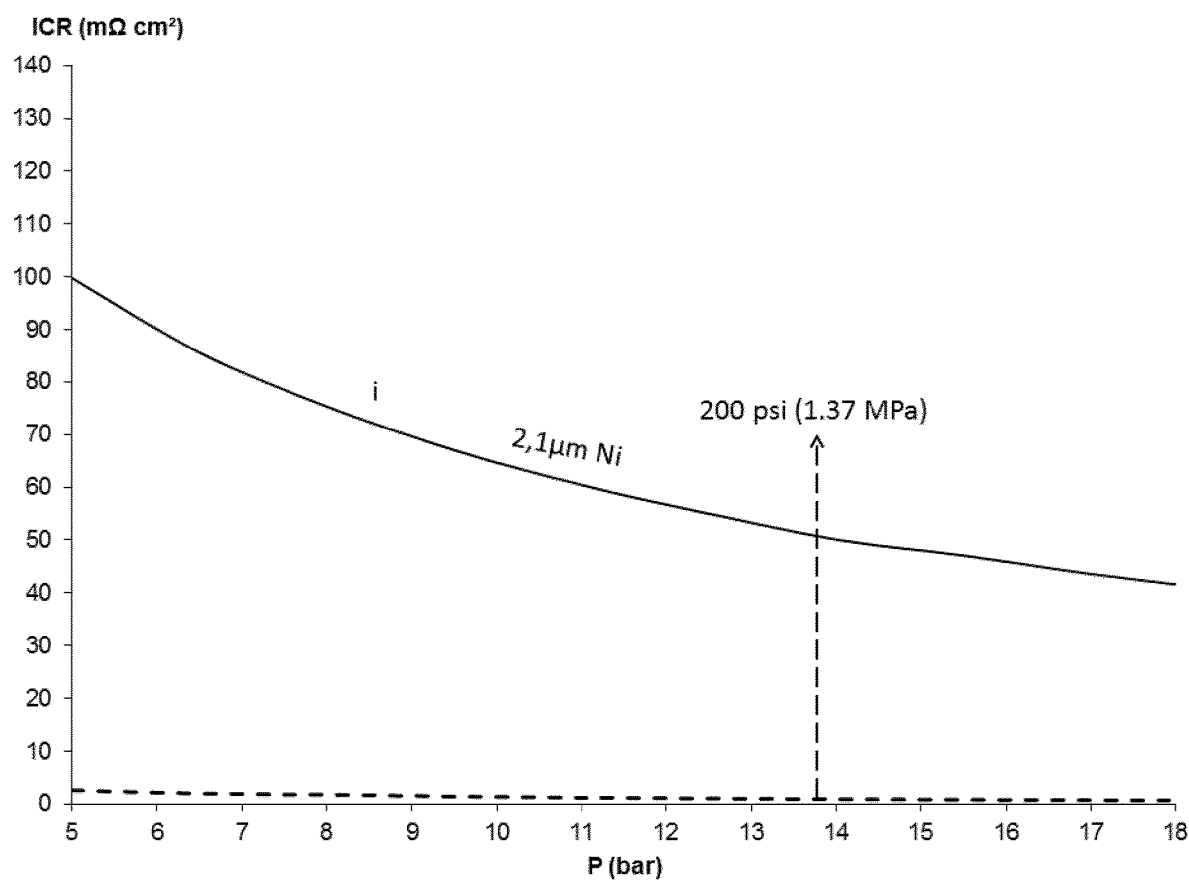

In FIG. 9 the curve for Ni (i) is compared with a NiMo alloy layer. It is immediately apparent that the ICR values for the dashed curve (330) is much lower.

Figure 10:
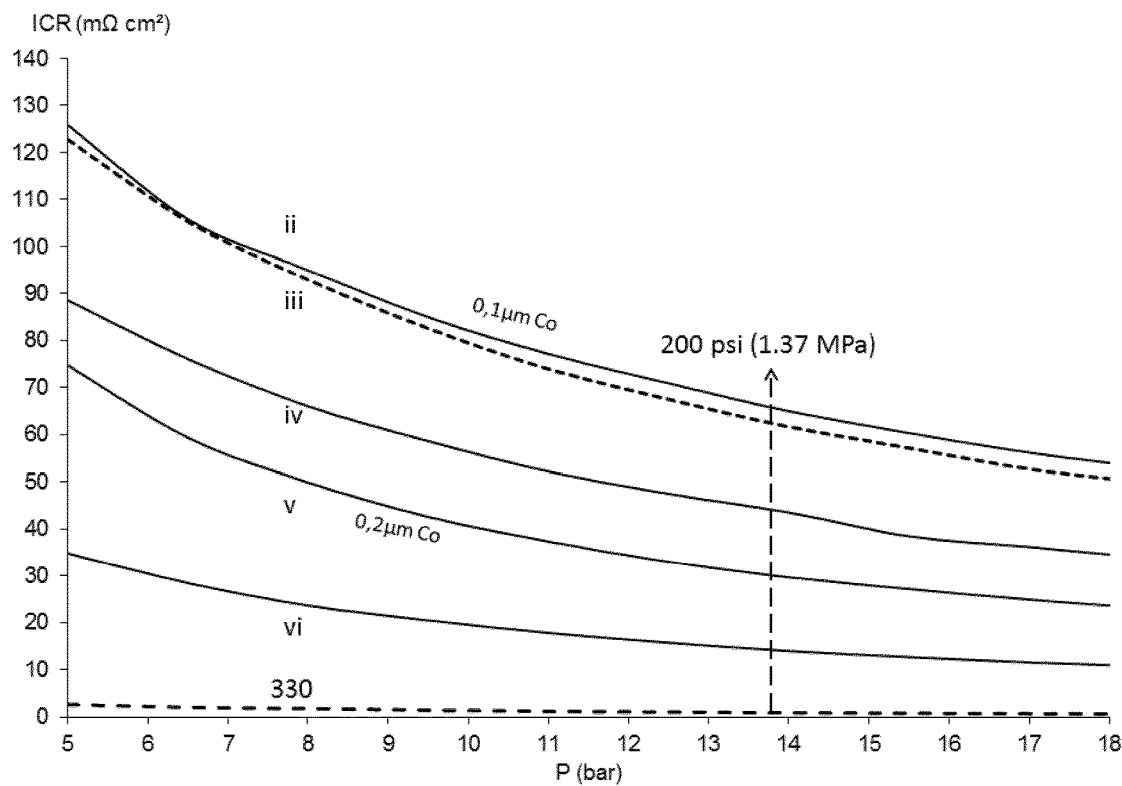
Figure 11:
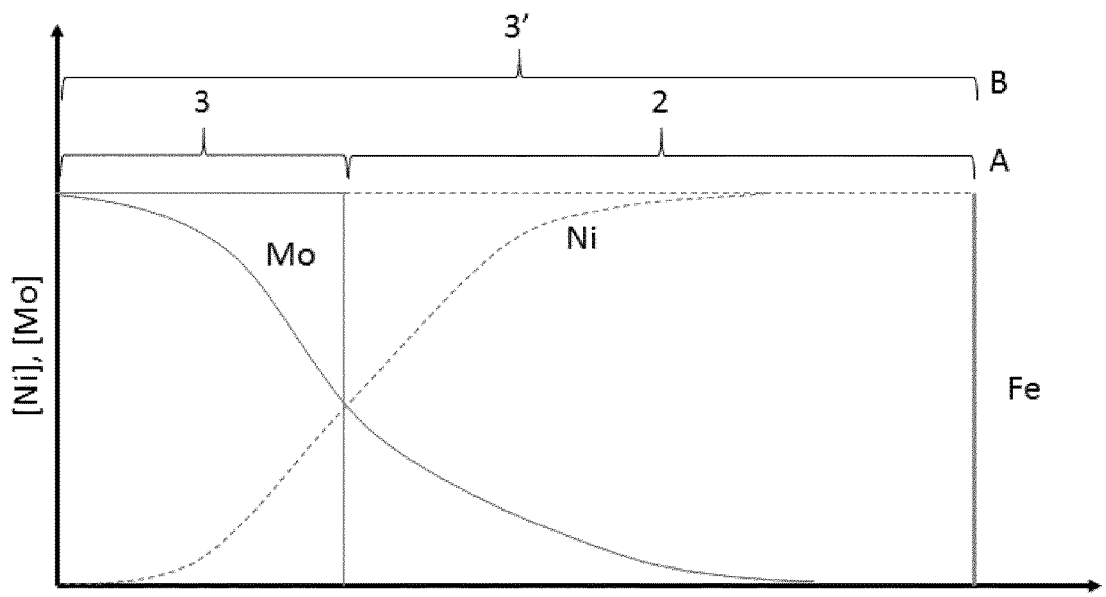

In FIG. 10 the curves for Ni+Co are compared with a NiMo alloy layer. It is immediately apparent that the values for the curve labelled "330" are much lower than even the lowest curve for Ni+Co. Hence even the Ni+Co layers are outperformed by the material according to the invention.

Tests performed on deep drawn material battery can material revealed that the ICR showed similar and consistent improvements over the Ni+Co layers and Ni layers.

The invention claimed is:

1. A method of producing a low interfacial contact resistance material for use in batteries or connectors comprising the following steps:
    providing a steel substrate in the form of a cold-rolled strip;
    providing a nickel or nickel-based layer on one or both sides of the steel substrate to form a plated substrate;
    electrodepositing a molybdenum oxide layer from an aqueous solution onto the nickel or nickel-based layer of the plated substrate wherein the plated substrate acts as a cathode, wherein the aqueous solution comprises a molybdenum salt and an alkali metal phosphate and wherein the pH of the aqueous solution is adjusted to between 4.0 and 6.5;
    wherein the plated substrate provided with the molybdenum oxide layer is subjected to an annealing step in a reducing atmosphere to, at least partly, reduce the molybdenum oxide in the molybdenum oxide layer to molybdenum metal in a reduction annealing step and to form, simultaneously or subsequently, in the annealing step a diffusion layer which contains nickel and molybdenum, wherein the nickel originates from the nickel or nickel-based layer and the molybdenum originates from the molybdenum oxide layer.

2. The method according to claim 1, wherein the molybdenum salt is ammonium molybdate.

3. The method according to claim 1, wherein the phosphate is sodium dihydrogen phosphate.

4. The method according to claim 1, wherein the nickel or nickel-based layer provided on the substrate is between 0.5 μm and 5 μm in thickness, and/or wherein the diffusion layer has a thickness of between 10 nm and 200 nm.

5. The method according to claim 1, wherein the method comprises at least one feature selected from the group consisting of:
    the temperature of the aqueous solution for the electrodeposition of the molybdenum oxide layer onto the nickel plated steel substrate is between 40° C. and 75° C.,
    the plating time for the electrodeposition of the molybdenum oxide layer onto the nickel plated steel substrate is between 5 and 30 seconds,
    the current density for the electrodeposition of the molybdenum oxide layer onto the nickel plated steel substrate is between 2 and 25 A/dm$^2$,
    the maximum annealing temperature during the annealing step is between 500 and 1050° C., and
    the annealing time is between 6 and 10 hours for a batch annealing process and between 10 and 120 seconds for a continuous annealing process.

6. The method according to claim 1, wherein the aqueous solution for the electrodeposition of the molybdenum oxide layer onto the nickel plated steel substrate comprises:
    between 10 and 50 g/l of $(NH_4)_6Mo_7O_{24}$, and/or
    between 20 and 80 g/l of $NaH_2PO_4$.

7. The method according to claim 1, wherein the low interfacial contact resistance material is used in a battery that comprises a steel can and/or a cap and the battery is produced by a process comprising:

a deep drawing and/or wall-ironing step to produce the steel can from a blank produced from the low interfacial contact resistance material wherein the side of the blank provided with the nickel-molybdenum alloy layer becomes the inside of the can, and/or a forming step to produce the cap to cover the open end of the steel can from the low interfacial contact resistance material wherein the side of the cap provided with the nickel-molybdenum alloy layer becomes the inside of the cap.

8. The method according to claim 1, wherein the low interfacial contact resistance material is provided in a form suitable for use as a connector material, and wherein the connector material connects individual batteries into a battery pack, and wherein the side of the connector material provided with the nickel-molybdenum alloy layer is connected to the anode or cathode of the individual batteries.

9. A low interfacial contact resistance material for use in batteries or connectors, produced according to the method of claim 1, comprising a steel strip substrate provided on one side with a nickel layer, and provided on the other side with a nickel-molybdenum alloy layer which is a diffusion layer which contains nickel and molybdenum wherein the nickel originates from the nickel or nickel-based layer and the molybdenum originates from the at least partly fully reduced molybdenum oxide layer, wherein the interfacial contact resistance of the nickel-molybdenum alloy layer is at most 20 $m\Omega \cdot cm^{-2}$ when measured at a pressure P of 1.37 MPa (200 psi) according to the method described in the description.

10. A low interfacial contact resistance material for use in batteries or connectors, produced according to the method of claim 1, comprising a steel strip substrate provided on both sides with a nickel-molybdenum alloy layer which are diffusion layers which contain nickel and molybdenum wherein the nickel originates from the nickel or nickel-based layers and the molybdenum originates from the at least partly fully reduced molybdenum oxide layers, wherein the interfacial contact resistance of the nickel-molybdenum alloy layers is at most 20 $m\Omega \cdot cm^{-2}$ when measured at a pressure P of 1.37 MPa (200 psi) according to the method described in the description.

11. A low interfacial contact resistance material according to claim 9, wherein the interfacial contact resistance of the nickel-molybdenum alloy layer or layers is at most 15 $m\Omega \cdot cm^{-2}$.

12. A low interfacial contact resistance material according to claim 9, wherein the interfacial contact resistance of the nickel-molybdenum alloy layer or layers is at most 10 $m\Omega \cdot cm^{-2}$.

13. A battery or connector material produced using the low interfacial contact resistance material according to claim 9.

14. A battery according to claim 13, comprising a can and/or a cap, wherein the can and/or the cap is produced from the low interfacial contact resistance material.

15. The connector material comprising a connector strip or connector produced from the low interfacial contact resistance material according to claim 9.

16. The method according to claim 1, wherein the plated substrate provided with the molybdenum oxide layer is subjected to the annealing step in the reducing atmosphere to fully reduce the molybdenum oxide in the molybdenum oxide layer to molybdenum metal in the reduction annealing step.

17. The low interfacial contact resistance material of claim 9, wherein the at least partly reduced molybdenum oxide layer is a fully reduced molybdenum oxide layer.

18. The low interfacial contact resistance material of claim 10, wherein the at least partly reduced molybdenum oxide layer is a fully reduced molybdenum oxide layer.

19. A battery according to claim 13, comprising a steel can and/or a cap, wherein the steel can and/or the cap is produced from the low interfacial contact resistance material;

wherein the battery is produced by a process comprising:
a deep drawing and/or wall-ironing step to produce the steel can from a blank produced from the low interfacial contact resistance material wherein the side of the blank provided with the nickel-molybdenum alloy layer becomes the inside of the can, and/or a forming step to produce the cap to cover an open end of the steel can from the low interfacial contact resistance material wherein a side of the cap provided with the nickel-molybdenum alloy layer becomes the inside of the cap.

* * * * *